US012555799B2

(12) United States Patent
Jo et al.

(10) Patent No.: US 12,555,799 B2
(45) Date of Patent: Feb. 17, 2026

(54) MANUFACTURING METHOD OF CATALYST FOR FUEL CELL HAVING BIMODAL PARTICLE SIZE

(71) Applicants: Hyundai Motor Company, Seoul (KR); Kia Corporation, Seoul (KR)

(72) Inventors: Hyun J. Jo, Gyeonggi-Do (KR); Yoon H. Cho, Seoul (KR); Dong Yoon Shin, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 599 days.

(21) Appl. No.: 18/062,044

(22) Filed: Dec. 6, 2022

(65) Prior Publication Data
US 2023/0307664 A1    Sep. 28, 2023

(30) Foreign Application Priority Data

Mar. 22, 2022    (KR) .................. 10-2022-0035076

(51) Int. Cl.
*H01M 4/92*    (2006.01)
*H01M 4/88*    (2006.01)

(52) U.S. Cl.
CPC ......... *H01M 4/926* (2013.01); *H01M 4/8882* (2013.01); *H01M 2250/20* (2013.01)

(58) Field of Classification Search
CPC .................................... H01M 4/926
See application file for complete search history.

(56) References Cited

U.S. PATENT DOCUMENTS

2012/0264598 A1*    10/2012    Carpenter ........... B82Y 30/00
                                                              502/326

FOREIGN PATENT DOCUMENTS

| KR | 20100024169 A | 3/2010 |
| KR | 20110024497 A | 3/2011 |
| KR | 20180028042 A | 3/2018 |

OTHER PUBLICATIONS

CN113659164andtransaltion (Year: 2021).*

* cited by examiner

*Primary Examiner* — Brian R Ohara
(74) *Attorney, Agent, or Firm* — Fox Rothschild LLP

(57) ABSTRACT

Proposed is a method of manufacturing a catalyst for a fuel cell. The manufacturing method includes loading platinum on a support using two or more platinum precursors having different reduction potentials.

16 Claims, 6 Drawing Sheets

MANUFACTURING METHOD OF CATALYST FOR FUEL CELL HAVING BIMODAL PARTICLE SIZE

CROSS REFERENCE TO RELATED APPLICATION

The present application claims priority to Korean Patent Application No. 10-2022-0035076, filed Mar. 22, 2022, the entire contents of which is incorporated herein for all purposes by this reference.

TECHNICAL FIELD

The present disclosure relates to a manufacturing method for a catalyst for a fuel cell. The catalyst may contribute to improvement of the output performance of the fuel cell.

BACKGROUND

Fuel cells are economical because they directly convert chemical energy into electrical energy and exhibit high energy efficiency, and at the same time, they are eco-friendly devices because there is no emission of pollutants.

As a catalyst for fuel cells, a platinum catalyst, in which platinum is loaded as an active metal on a support, has been mainly used. A pure platinum catalyst has a high manufacturing cost and low efficiency, so its performance compared to usage is low.

An alloy catalyst made by alloying platinum and a transition metal has been developed to overcome this problem. The alloy catalyst has high activity, so it is possible to implement a fuel cell having high performance even with a small amount of platinum compared to the platinum catalyst. However, the transition metal is eluted, causing a problem with durability, such as poisoning the electrolyte membrane. In addition, the alloy catalyst is disadvantageous in terms of mass transfer because the active metal particles are formed larger than that of the platinum catalyst and thus are not suitable for a high-output fuel cell.

SUMMARY

In preferred aspects, provided is a catalyst for a fuel cell having high activity and low mass transfer resistance by forming a catalyst on which an active metal having a bimodal particle size is loaded.

The objective of the present disclosure is not limited to the objective mentioned above. The objective of the present disclosure will become more apparent from the following description and will be realized by means and combinations thereof described in the claims.

In an aspect, provided is a method of manufacturing a catalyst for a fuel cell and the method may include loading platinum on a support using two or more platinum precursors having different reduction potentials.

The platinum may be loaded on the support by steps including: preparing a first solution including a first platinum precursor and a first solvent; preparing a second solution including a second platinum precursor having a greater reduction potential than the first platinum precursor and a second solvent; preparing a suspension including a support; preparing a first admixture including the first solution and the suspension; preparing a second admixture including the first admixture and the second solution; adjusting the pH of the second admixture to about 2 or greater and less than about 7; and separating the catalyst from the second admixture.

Preferably, the pH of the second solution may be greater than about 7 and less than or equal to about 11.

Preferably, the pH of the first admixture may be greater than about 7 and less than or equal to about 11.

Preferably, the pH of the second admixture may be about 2 or greater and less than or equal to about 7.

The method may further include a step of adjusting the pH of the second solution.

The method may further include a step of adjusting the pH of the first admixture.

The method may include, for separating the catalyst, filtering the second admixture and washing the filtered material, i.e., catalyst on the filter.

A platinum precursor as referred to herein is a material that comprises platinum and can undergo treatment or reaction to provide a thither platinum material as disclosed herein. For instance, a platinum precursor suitably may be selected from any metallo-organic or platinum salt complexes for example that can be reduced or otherwise reacted as disclosed herein.

Examples of suitable platinum precursors include, but are not limited to, platinum(II) acetylacetonate, diammineplatinum(IV) hexachloride, diammineplatinum(II) nitrite, dimethyl(1,5-cyclooctadiene)platinum(II), potassium tetrachloroplatinate(II), dihydrogen hexachloroplatinate(IV) hydrate, tetraammineplatinum(II) nitrate, and cis-dichlorobis(triphenylphospine)platinum(II), and chemically compatible mixtures of any of these.

In one embodiment, the first platinum precursor may include $(NH_4)_2PtCl_6$.

The first solvent may include an organic solvent and an aqueous solvent.

The organic solvent may include one or more selected from the group consisting of ethylene glycol, diethylene glycol, triethylene glycol, tetraethylene glycol, and dipropylene glycol A mass ratio of the organic solvent to the aqueous solvent may be about 6:4 to 9:1.

In embodiments, the second platinum precursor may include $H_2PtCl_6$, $Na_2PtCl_6$, or a combination thereof.

In embodiments, a second platinum precursor may have a reduction potential that is 1, 2, 3, 4, 5, 6, 7, 8, 9, 10, 20, 30, 40, 50, 60, 70, 80 90 or 100 percent or more greater than the first platinum precursor.

Reduction potentials of materials are referred to herein are suitably determined by known methods including a cell measuring the amount of charge that passes between the cells with a voltmeter, e.g. a standard reduction potential can be measured using a galvanic cell which contains a standard hydrogen electrode (SHE) on one side and an unknown chemical half cell on the other side. The standard reduction potential is defined relative to a standard hydrogen electrode (SHE) reference electrode, which is arbitrarily given a potential of 0.00 volts.

In embodiments, the first platinum precursor and the second platinum precursor are different materials or compositions.

The second solvent may include one or more selected from the group consisting of ethylene glycol, diethylene glycol, triethylene glycol, tetraethylene glycol, and dipropylene glycol.

The support may include: a carbon support; or a carbon support doped with one or more selected from the group consisting of nitrogen (N), sulfur (S), phosphorus (P), and oxygen (O).

A molar ratio of the first platinum precursor and the second platinum precursor in the second admixture may be about 5:5 to 9:1.

Preferably, the second admixture may be prepared as the first admixture is refluxed and the second admixture is cooled The refluxing may be performed at a temperature of about 200° C. or less for about 1 hour to 6 hours.

The method may further include: loading additional transition metal on the support on which platinum is loaded; and heat-treating the support on which the additional transition metal and platinum are loaded.

The additional transition metal may include nickel (Ni), cobalt (Co), manganese (Mn), and a combination thereof.

The heat-treating may be performed in a vacuum or reduced gas atmosphere at about 700° C. to 900° C. for about 1 hour to 4 hours.

The reduced gas atmosphere may include an inert gas and hydrogen gas.

The method may further include, after the heat-treating the support on which the additional transition metal and platinum are loaded, treating a resultant of heat-treating with an acid solution.

The acid solution may include one or more selected from the group consisting of nitric acid, formic acid, hydrochloric acid, sulfuric acid, and acetic acid.

The resultant of heat-treating may be treated with the acid solution at a temperature of about 50° C. to 100° C.

References herein to a solution also include dispersions and other fluid compositions and admixtures that may or may not be true solutions.

In an aspect, provided is a fuel cell including the catalyst manufactured by the methods described herein.

In another aspect, provided is a vehicle including the fuel cell as described herein.

Other aspects of the disclosure are disclosed infra.

Since the catalyst, according to various exemplary embodiments of the present disclosure, has high activity and low mass transfer resistance, a high-output fuel cell can be obtained by using the catalyst.

The effects of the present disclosure are not limited to the effects mentioned above. It should be understood that the effects of the present disclosure include all effects that can be inferred from the following description.

DETAILED DESCRIPTION

Figure 1:
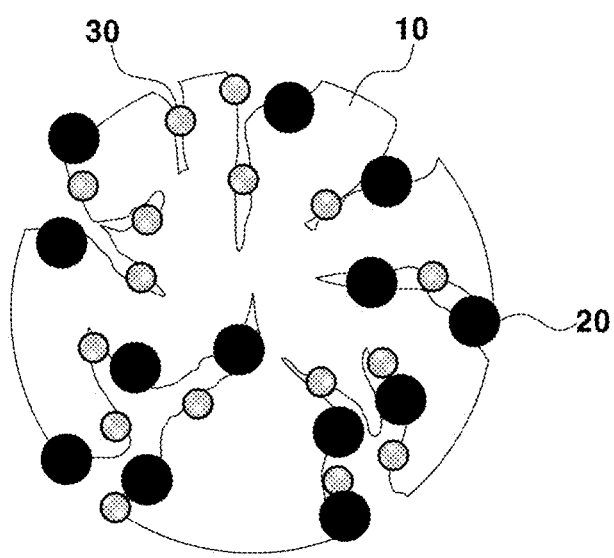
FIG. 1 shows an exemplary catalyst for a fuel cell according to an exemplary embodiment of the present disclosure.

The above objectives, other objectives, features, and advantages of the present disclosure will be easily understood through the following preferred embodiments in conjunction with the accompanying drawings. However, the present disclosure is not limited to the embodiments described herein and may be embodied in other forms. Rather, the embodiments introduced herein are provided so that the disclosed content may be thorough and complete, and the spirit of the present disclosure may be sufficiently conveyed to those skilled in the art.

Like reference numerals have been used for like elements in describing each figure. In the accompanying drawings, the dimensions of the structures are enlarged than the actual size for clarity of the present disclosure. Terms such as first, second, etc., may be used to describe various elements, but the elements should not be limited by the terms. The above terms are used only for the purpose of distinguishing one component from another. For example, without departing from the scope of the present disclosure, a first component may be referred to as a second component, and similarly, a second component may also be referred to as a first component. The singular expression includes the plural expression unless the context clearly dictates otherwise.

In this specification, the terms "include" or "have" should be understood to designate that one or more of the described features, numbers, steps, operations, components, or a combination thereof exist, and the possibility of addition of one or more other features or numbers, operations, components, or combinations thereof should not be excluded in advance. Also, when a part of a layer, film, region, plate, etc., is said to be "on" another part, this includes not only the case where it is "on" another part but also the case where another part is in the middle. Conversely, when a part of a layer, film, region, plate, etc., is said to be "under" another part, this includes not only cases where it is "directly under" another part but also a case where another part is in the middle.

Unless otherwise specified, all numbers, values, and/or expressions expressing quantities of ingredients, reaction conditions, polymer compositions, and formulations used herein contain all numbers, values and/or expressions in which such numbers essentially occur in obtaining such values, among others. Since they are approximations reflecting various uncertainties in the measurement, it should be understood as being modified by the term "about" in all cases.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when a numerical range is disclosed in this disclosure, this range is continuous and includes all values from the minimum to the maximum value containing the maximum value of this range unless otherwise indicated. Furthermore, when such a range refers to an integer, all integers, including the minimum value to the maximum value, containing the maximum value are included unless otherwise indicated. In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

FIG. 1 shows an exemplary catalyst for a fuel cell according to an exemplary embodiment of the present disclosure. The catalyst may include a support 10, a first active metal 20, and a second active metal 30 loaded on the support. The first active metal 20 and the second active metal 30 may include platinum or an alloy of platinum and a transition metal.

The catalyst may include an active metal having a bimodal particle size. Here, the term of "a bimodal particle size" may mean that when the distribution of the particle size of the active metal is measured, the result of having two different modes is shown. The mode may be the data value that occurs most often in a data set.

The catalyst for a fuel cell, including the active metal having the bimodal particle size, can be implemented by using starting materials having different reduction potentials.

The method of manufacturing a catalyst for a fuel cell may include: loading platinum on a support by using two or more platinum precursors having different reduction potentials; loading a transition metal on the support on which platinum is loaded; and heat-treating the support on which the transition metal and platinum are loaded; and treating the resultant of the heat-treating with an acid solution.

Figure 2:
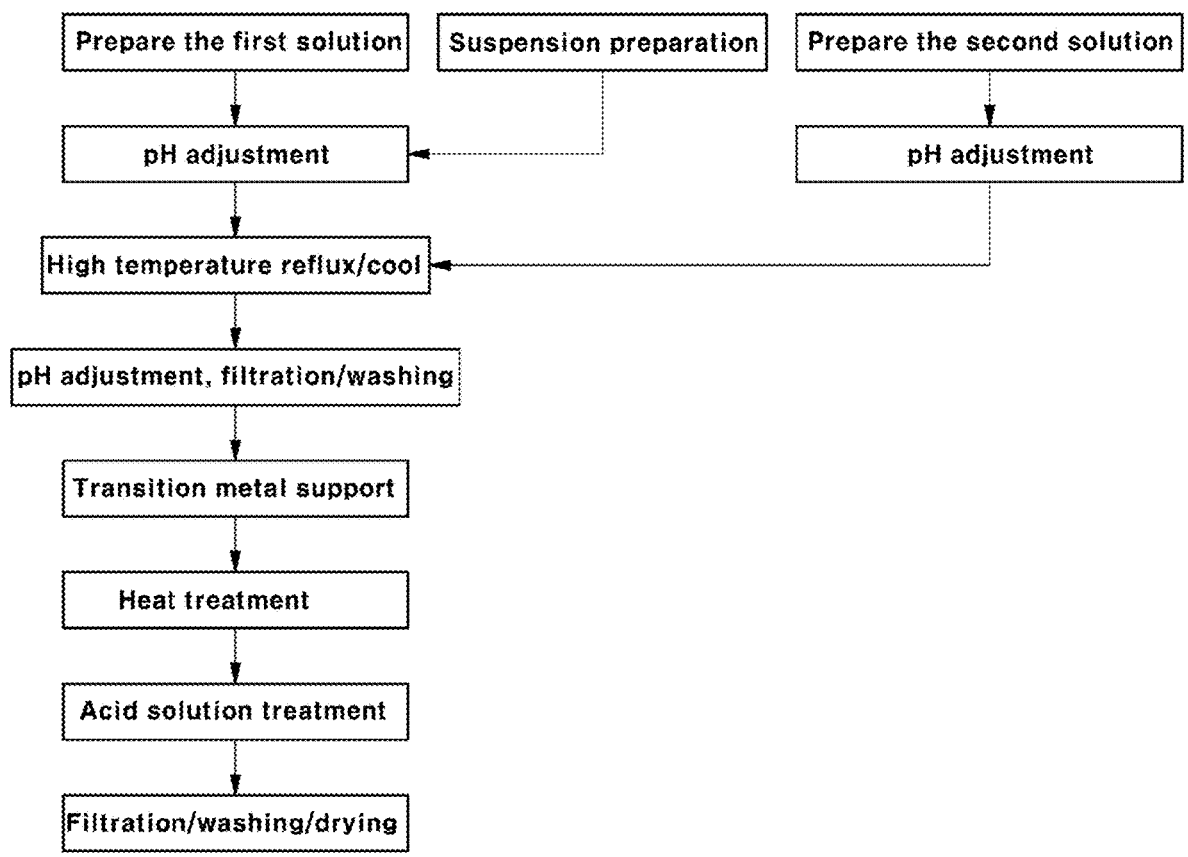
FIG. 2 shows an exemplary manufacturing method of a catalyst for a fuel cell according to an exemplary embodiment of the present disclosure.

Hereinafter, the present disclosure will be described in detail with reference to the flowchart shown in FIG. 2.

For example, the method of loading platinum on the support may include: (a) preparing a first solution including a first platinum precursor and a first solvent; (b) preparing a second solution including a second platinum precursor having a greater reduction potential than the first platinum precursor and a second solvent; (c) preparing a suspension including a support; (d) prepare a first admixture, e.g., by mixing the first solution and the suspension and adjusting the pH to greater than about 7 and less than or equal to about 11; (e) optionally adjusting the pH of the second solution to greater than about 7 and less than or equal to about 11; (f) preparing the second admixture including the second solution and the first solution, for example, while refluxing the first admixture and cooling the second admixture; (g) adjusting the pH of the second admixture to about 2 or more and less than about 7; and (h) separating the catalyst from the second admixture, e.g., filtering and washing the second admixture.

The first platinum precursor may be a starting material having low reducing potential, and may include an ammonium-based compound. The first platinum precursor may suitably include $(NH_4)_2PtCl_6$.

The first solvent may include a mixed solvent of an organic solvent and an aqueous solvent. The organic solvent may include one or more selected from the group consisting of ethylene glycol, diethylene glycol, triethylene glycol, tetraethylene glycol, and dipropylene glycol. The organic solvent may also serve as a reducing agent. The aqueous solvent may include water. The mass ratio of the organic solvent to the aqueous solvent may be about 6:4 to 9:1.

The second platinum precursor may be a starting material having a high reduction potential and may include a non-ammonium-based compound. The second platinum precursor may suitably include $H_2PtCl_6$, $Na_2PtCl_6$, or a combination thereof.

The second solvent may include one or more selected from the group consisting of ethylene glycol, diethylene glycol, triethylene glycol, tetraethylene glycol, and dipropylene glycol.

The support may include a carbon support. For example, the support may include carbon black, carbon nanotubes, carbon nanofibers, and the like. The carbon support may be doped with one or more selected from the group consisting of nitrogen (N), sulfur (S), phosphorus (P), and oxygen (O).

A glycol anion for reduction of the first platinum precursor may be formed by mixing the first solution and the suspension prepared as above and adjusting the pH to greater than about 7 and less than or equal to about 11.

A method of mixing the first solution and the suspension is not particularly limited, and an ultrasonic treatment device, a stiffer, or the like may be used. In addition, the pH can be adjusted by adding a base solution.

A glycol anion for reduction of the second platinum precursor may be formed by adjusting the pH of the second solution to greater than about 7 and less than or equal to about 11.

While adding the pH-adjusted second solution to a mixture solution of the pH-adjusted first solution and the suspension, the mixture solution, which is added the pH-adjusted second solution, may be refluxed at a high temperature to be mixed and then cooled. For example, the pH-adjusted second solution may be dropped to the mixture solution while refluxing the mixture solution at a high temperature. Preferably, the first platinum precursor and the second platinum precursor may be reduced.

The pH-adjusted second solution may be added so that the molar ratio of the first platinum precursor to the second platinum precursor may be about 5:5 to 9:1. When the molar ratio of the first platinum precursor and the second platinum precursor falls within the above numerical range, an active metal having a bimodal particle size may be formed.

The refluxing may be performed at a temperature of about 200° C. or less for about 1 hour to 6 hours. The lower limit of the temperature is not particularly limited, and may be, for example, about 80° C. or greater, or about 100° C. or greater, or about 120° C. or greater.

After refluxing, the pH of a resultant may be adjusted to about 2 or greater and less than about 7, as a result, platinum may be loaded on the support. The method for adjusting the pH is not particularly limited, for example, an acid solution may be added.

Thereafter, impurities may be removed through filtration and washing.

Additional transition metal may be loaded on the platinum-loaded support obtained by the above method.

The additional transition metal may include nickel (Ni), cobalt (Co), manganese (Mn), or a combination thereof.

The loading method for a transition metal is not particularly limited, and the transition metal may be loaded through a method commonly used in the technical field to which the present disclosure pertains. For example, the platinum-loaded support may be added to and dispersed in a solution including the precursor of the transition metal, and the pH is adjusted to reduce the precursor of the transition metal, thereby loading the transition metal on the support.

Thereafter, the support loaded by platinum and the additional transition metal may be heat-treated in a vacuum or reduced gas atmosphere at a temperature of about 700° C. to 900° C. for about 1 hour to 4 hours to alloy the platinum and transition metal.

The reduced gas atmosphere may be formed by a mixed gas, including an inert gas and hydrogen gas. The inert gas may include, for example, argon gas, nitrogen gas, or the like.

After the heat-treating, the support loaded with platinum and the additional transition metal may be treated by an acid solution to remove impurities such as unsupported transition metal. The acid solution may include one or more selected from the group consisting of nitric acid, formic acid, hydrochloric acid, sulfuric acid, and acetic acid. In addition, the acid solution may be treated at a temperature of about 50° C. to 100° C. The method of treating the acid solution is not particularly limited, for example, the resultant of heat-treating may be washed by the acid solution or be immersed in the acid solution.

The alloy catalyst may be obtained by filtering, washing, and drying the second admixture treated with the acid solution.

EXAMPLE

Hereinafter, another form of the present disclosure will be described in more detail through the following examples. The following examples are merely illustrative to help the understanding of the present disclosure, and the scope of the present disclosure is not limited thereto.

Example 1

The catalyst for a fuel cell was prepared by the manufacturing method, according to the present disclosure, by adjusting the molar ratio of the first platinum precursor and the second platinum precursor to 5:5.

Example 2

The catalyst for a fuel cell was prepared in the same manner as in Example 1, except that the molar ratio of the first platinum precursor and the second platinum precursor was adjusted to 6:4.

Comparative Example

The catalyst for a fuel cell was prepared in the same manner as in Example 1, except that only the first platinum precursor was used.

Figure 3A:
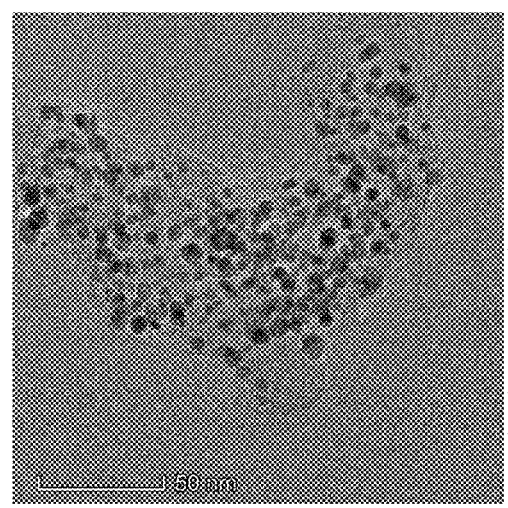
FIG. 3A shows a result of analyzing an exemplary catalyst for a fuel cell according to Example 1 by transmission electron microscopy (TEM)
Figure 3B:
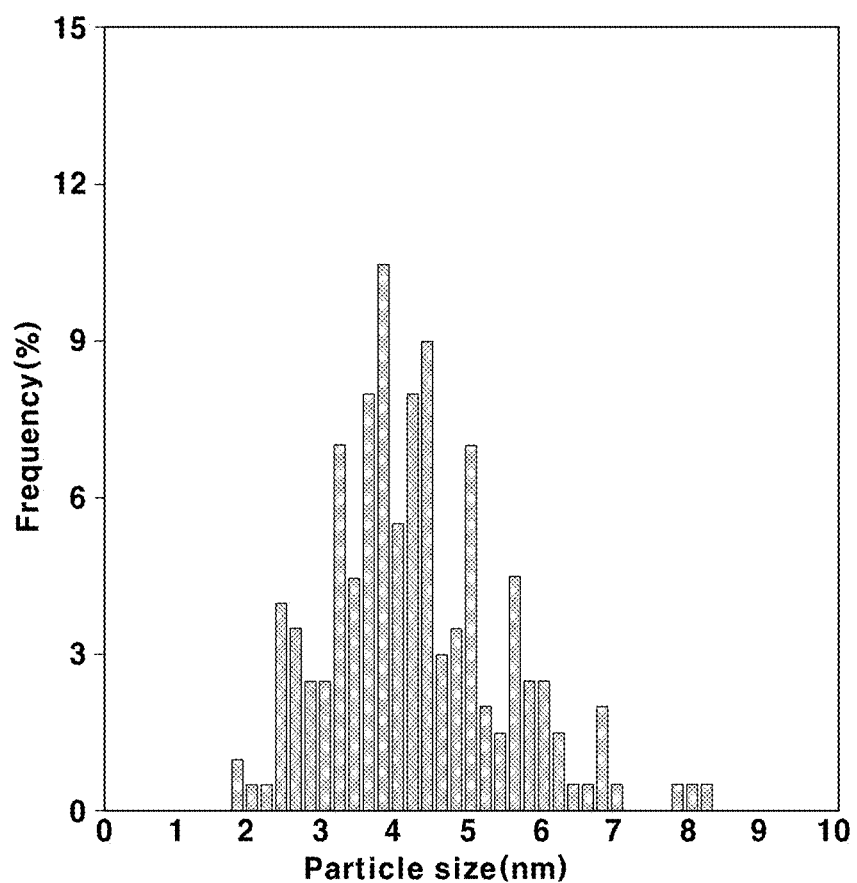
FIG. 3B shows a particle size distribution of an exemplary active metal included in the catalyst for a fuel cell according to Example 1.

FIG. 3A shows a result of analyzing the catalyst for a fuel cell according to Example 1 by transmission electron microscopy (TEM). FIG. 3B shows the particle size distribution of an active metal included in the catalyst for a fuel cell according to Example 1.

Figure 4A:
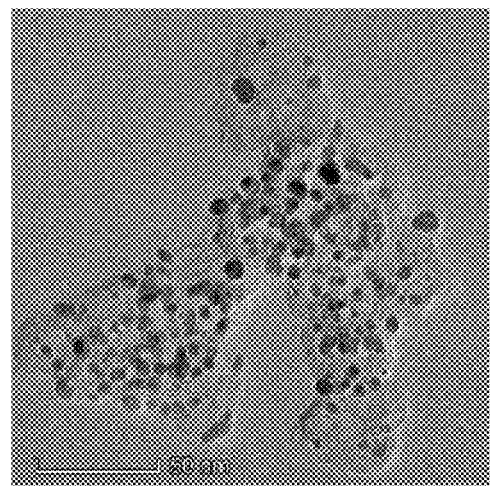
FIG. 4A shows a result of analyzing an exemplary catalyst for a fuel cell according to Example 2 using a transmission electron microscope (TEM)
Figure 4B:
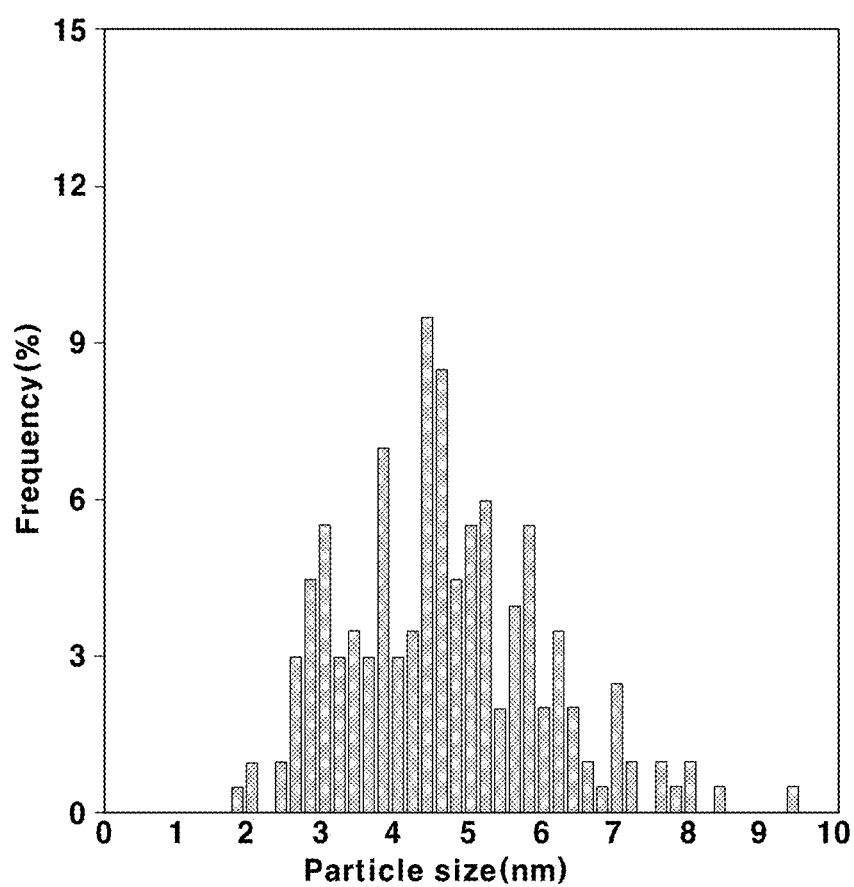
FIG. 4B shows a particle size distribution of an exemplary active metal included in the catalyst for a fuel cell according to Example 2.

FIG. 4A shows a result of analyzing the catalyst for a fuel cell according to Example 2 using a transmission electron microscope (TEM). FIG. 4B shows the particle size distribution of an active metal included in the catalyst for a fuel cell according to Example 2.

Figure 5A:
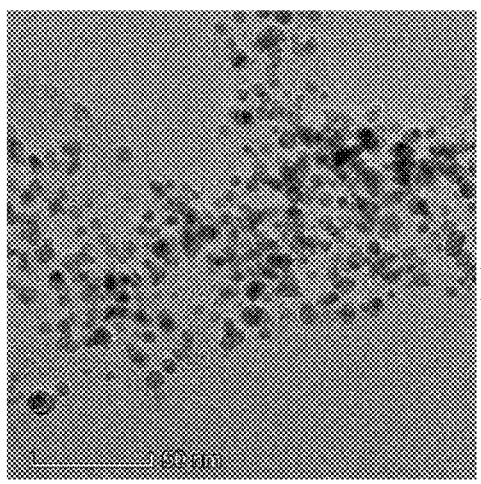
FIG. 5A shows a result of analyzing a catalyst for a fuel cell according to the Comparative Example with a transmission electron microscope (TEM)
Figure 5B:
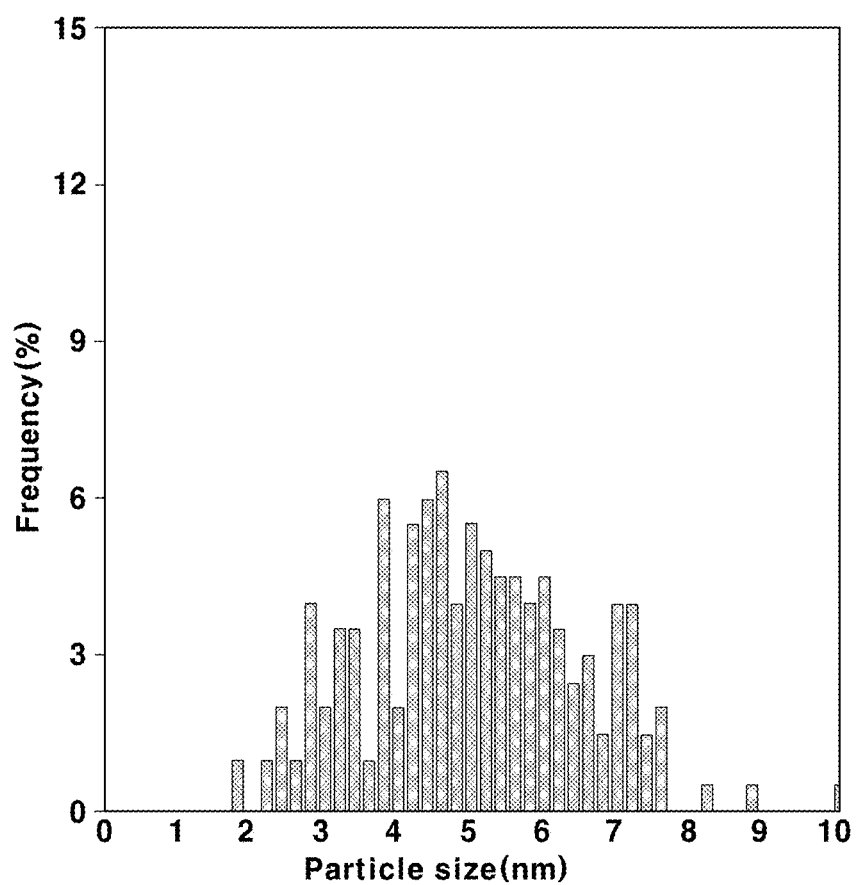
FIG. 5B shows a particle size distribution of an active metal included in a catalyst for a fuel cell according to the Comparative Example.

FIG. 5A shows a result of analyzing the catalyst for a fuel cell according to a Comparative Example with a transmission electron microscope (TEM). FIG. 5B shows the particle size distribution of an active metal included in a catalyst for a fuel cell according to the Comparative Example.

According to results in Examples 1 and 2, the particle size distribution of the active metal was different from that of the Comparative Example, and the average particle size was decreased according to the generation of fine particles.

Figure 6:
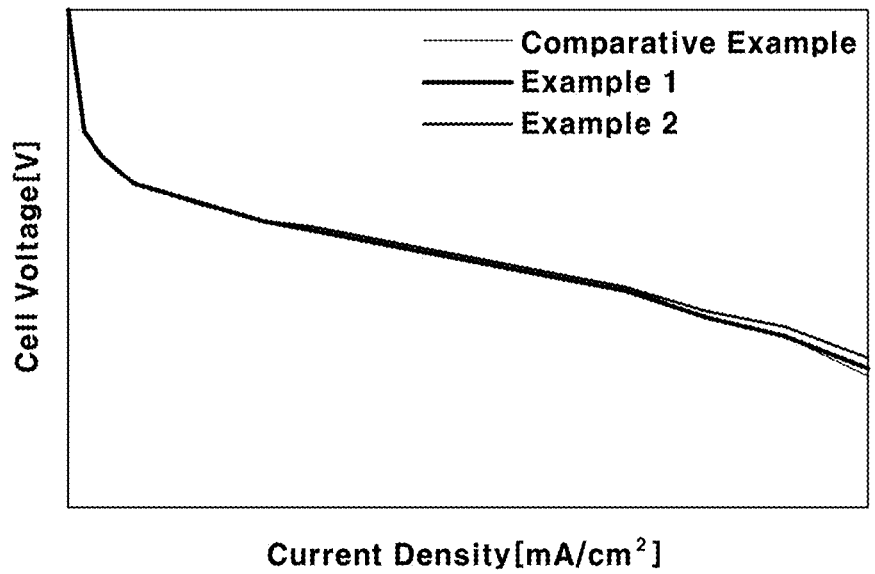
FIG. 6 shows current-voltage characteristics of a film-electrode assembly, including catalysts for fuel cells, according to Examples 1 and 2 and the Comparative Example.
Figure 7:
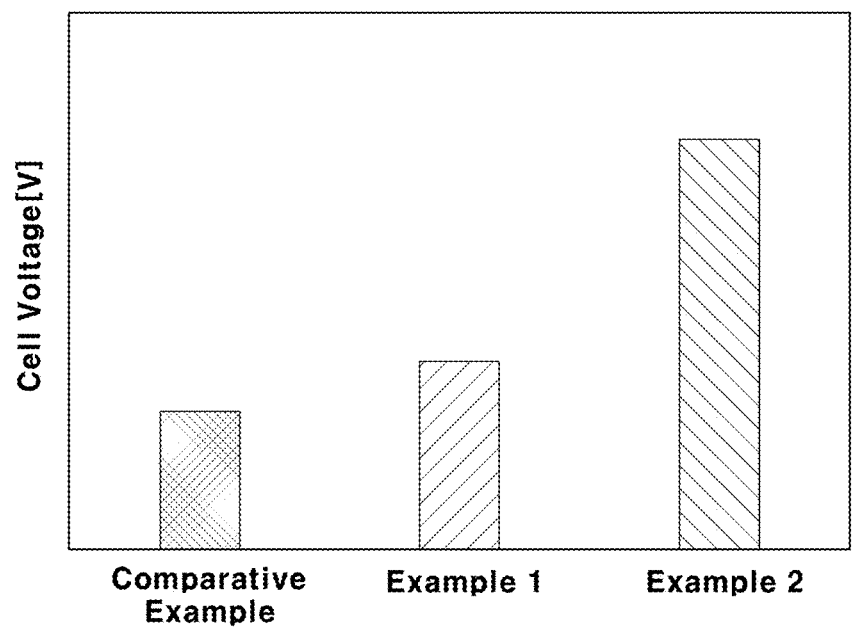
FIG. 7 shows a result of comparing voltages in the high current region of FIG. 6.

FIG. 6 shows a result of measuring current-voltage characteristics of a film-electrode assembly, including catalysts for fuel cells, according to Examples 1 and 2 and the Comparative Example. FIG. 7 shows a result of comparing voltages in the high current region of FIG. 6. As shown in FIGS. 6 and 7, the low output performance of Examples 1 and 2 was equivalent to that of the Comparative Example, and the high output performance was significantly improved. Thus, the catalysts, according to Examples 1 and 2, have improved mass transfer while maintaining high activity.

As described above in detail, the scope of the present disclosure is not limited to the experimental examples and embodiments, and various modifications and improvements of those skilled in the art defined in the following claims are also included in the scope of the present disclosure.

What is claimed is:

1. A method of manufacturing a catalyst for a fuel cell, comprising:
   loading platinum on a support using two or more platinum precursors having different reduction potentials,
   wherein the platinum is loaded on the support by steps comprising:
   preparing a first solution comprising a first platinum precursor and a first solvent,
   preparing a second solution comprising a second platinum precursor having a greater reduction potential than the first platinum precursor and a second solvent wherein the pH of the second solution is greater than about 7 and less than or equal to about 11;
   preparing a suspension comprising the support;
   preparing a first admixture comprising the first solution and the suspension wherein the pH of the first admixture is greater than about 7 and less than or equal to about 11;

preparing a second admixture including the first admixture and the second solution wherein the pH of the second admixture is about 2 or greater and less than or equal to about 7; and separating be catalyst from the second admixture.

2. The method of claim 1, wherein the first platinum precursor comprises $(NH_4)_2PtCl_6$.

3. The method of claim 1, wherein the first solvent comprises an organic solvent and an aqueous solvent, the organic solvent comprises one or more selected from the group consisting of ethylene glycol, diethylene glycol, triethylene glycol, tetraethylene glycol, and dipropylene glycol, and a mass ratio of the organic solvent to the aqueous solvent is about 6:4 to 9:1.

4. The method of claim 1, wherein the second platinum precursor comprises $H_2PtCl_6$, $Na_2PtCl_6$, or any combinations thereof.

5. The method of claim 1, wherein the second solvent comprises one or more selected from the group consisting of ethylene glycol, diethylene glycol, triethylene glycol, tetraethylene glycol, and dipropylene glycol.

6. The method of claim 1, wherein the support comprises:
a carbon support; or
a carbon support doped with one or more selected from the group consisting of nitrogen, sulfur, phosphorus, and oxygen.

7. The method of claim 1, wherein a molar ratio the first platinum precursor and the second platinum precursor in the second admixture is about 5:5 to 9:1.

8. The method of claim 1, wherein the second admixture is prepared as the first admixture is refluxed and the second admixture is cooled.

9. The method of claim 8, wherein the refluxing is performed at a temperature of about 200° C. or less for about 1 hour to 6 hours.

10. The method of claim 1, the method further comprising:

loading additional transition metal on the support on which platinum is loaded; and heat-treating the support on which the additional transition metal and platinum are loaded.

11. The method of claim 9, wherein the transition metal comprises nickel, cobalt, manganese, or any combinations thereof.

12. The method of claim 10, wherein the heat-treating is performed in a vacuum or reduced gas atmosphere at about 700° C. to 900° C. for about 1 hour to 4 hours.

13. The method of claim 12, wherein the reduced gas atmosphere comprises an inert gas and hydrogen gas.

14. The method of claim 11, the method further comprising, after the heat-treating, treating the support with an acid solution.

15. The method of claim 14, wherein the acid solution comprises one or more selected from the group consisting of nitric acid, formic acid, hydrochloric acid, sulfuric acid, and acetic acid.

16. The method of claim 14, wherein the treating with the acid solution is performed at a temperature of about 50° C. to 100° C.

* * * * *